United States Patent Office 3,723,056
Patented Mar. 27, 1973

1

3,723,056
MIXTURE OF PHENYLAZOPHENYLAZONAPH-
THYL TRI(LITHIUM SULFONATE) DYESTUFFS
Alvin C. Litke, Seneca, N.Y., assignor to Allied
Chemical Corporation, New York, N.Y.
No Drawing. Original application May 12, 1969, Ser. No. 823,989, now Patent No. 3,635,944. Divided and this application Sept. 22, 1971, Ser. No. 182,882
Int. Cl. D21h 1/46
U.S. Cl. 8—26    1 Claim

ABSTRACT OF THE DISCLOSURE

Highly water soluble phenylazophenylazonaphthyl tri-(lithium sulfonate) dyestuffs adapted to dye cellulosic fibers bright, light-fast violet shades.

This is a division of application Ser. No. 823,989, filed May 12, 1969, now U.S. Pat. 3,635,944 for "Highly Water Soluble Disazo Dyestuffs."

The present invention relates to novel disazo dyestuffs and more particularly to novel water soluble disazo dyes. It is especially concerned with novel water-soluble disazo dyes which color cellulosic fiber in bright light-fast violet shades.

Prior art violet azo dyes for cellulosic fibers, e.g. paper, include secondary phenylazophenylazonaphthyl dyes containing two sodium sulfonate radicals as water solubilizing substituents, for example, C.I. Direct Violet 31 (Part II reference 27880) and C.I. Direct Violet 9 (Part II reference 27885). The water solubility of these disazo dyes is relatively poor (only about 1 to 2 weight percent at ambient temperature), prohibiting their use in concentrated aqueous dyebaths, i.e. dyebaths containing about 15 weight percent dissolved dye. Moreover, these dyes, as conventionally manufactured, precipitate from the aqueous mixtures in which they are prepared, generally requiring costly tedious isolation, purification and pulverization of the solid product. In addition to the foregoing disadvantages, these dyes provide relatively dull, unattractive dyeings of inadequate light-fastness.

It is an object of the present invention to devise novel highly water soluble disazo dyes which color cellulosic fiber in bright light-fast violet shades.

This and other objects and advantages will be apparent from the following description of my invention.

The disadvantages of the aforementioned prior art, disazo dyes are overcome by the novel phenylazophenylazonaphthyl dyestuffs of my invention which contain three lithium sulfonate radicals and which correspond to the structural formula:

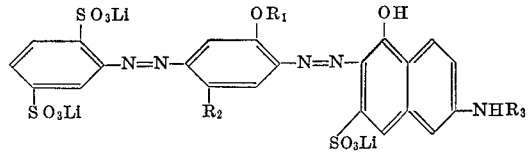

wherein $R_1$ and $R_2$ represent alkyl radicals of one to six carbon atoms and $R_3$ represents hydrogen or phenyl.

The invention preferably contemplates a binary mixture of dyes of the above formula which differ only in the nature of the $R_3$ substituent.

Surprisingly, the present violet dyestuffs are about ten times more soluble in water at ambient temperature than similar disazo dyes containing two sodium sulfonate substituents. Unexpectedly, the present dyes are substantially more fast to light than the aforementioned similar dyestuffs even when the latter contain a chlorine substituent which often has the effect of enhancing light fastness. The dyes of the invention containing three lithium sulfonate groups are surprisingly brighter in shade than similar dyes containing two sodium sulfonate substituents or four lithium sulfonate substituents. Unexpectedly, the tinctorial strength of the preferred dye mixture of the invention is greater than that of either of the component dyes of the mixture.

The violet dyes of my invention can be prepared by conventional reaction techniques. My dyes are conveniently produced by coupling diazotized 2-amino-p-benzene disulfonic acid into a 2-alkoxy 5-alkylaniline in aqueous acidic medium, diazotizing the monoazo coupling product, and coupling the resulting diazonium salt into aqueous I-acid (6-amino-1-naphthol - 3 - sulfonic acid), phenyl I-acid (6-anilino-1-naphthol-3-sulfonic acid) or mixtures thereof which are charged as free acids or as lithium salts. Sufficient lithium alkali; e.g. lithium hydroxide, lithium hydroxide monohydrate or lithium carbonate, is charged to the latter coupling mass to maintain the degree of alkalinity required for coupling ortho to the hydroxy substituent of the naphthalene nucleus (i.e. a pH above 8, advantageously of about 9–10) and to form the tri-lithium salt of the coupled product. The resultant aqueous coupling mass (containing about 15 weight percent or more dissolved dye) can be used to dye paper and other cellulosic materials by conventional procedures after dilution with water as desired. Alternatively, the dyestuff can be recovered from the aqueous coupling mass by evaporation of water therefrom.

The preparative procedure is illustrated by the equations shown below.

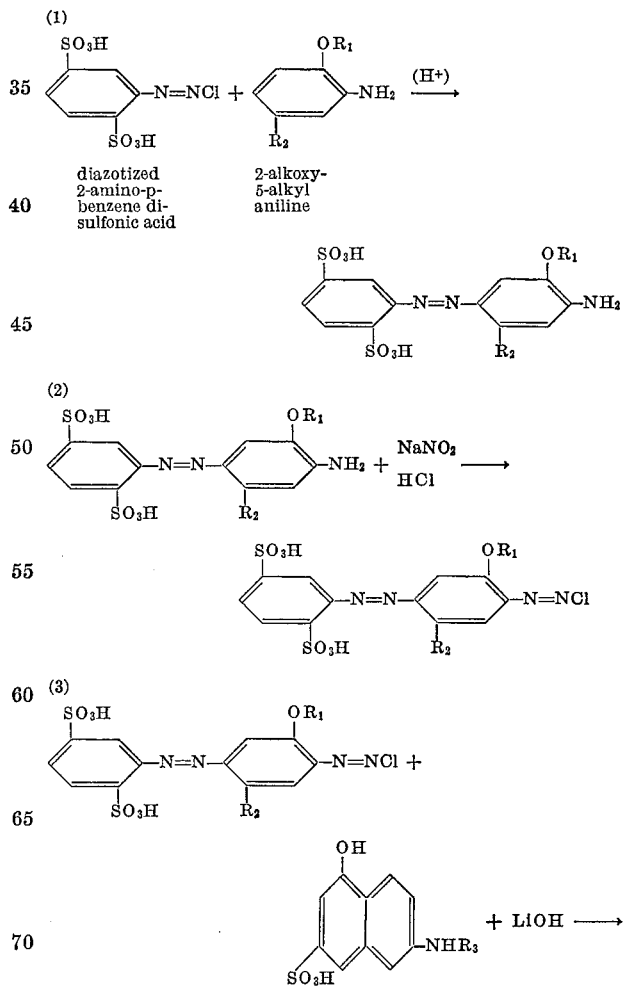

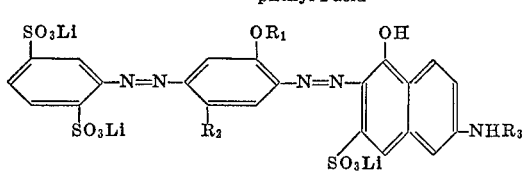

I acid or phenyl I acid

Suitable 2-alkoxy-5-alkyl anilines contemplated for the preparation of the present novel dyestuffs contain alkyl and alkoxy groups of one to six carbon atoms. Typical suitable 2-alkoxy-5-alkyl anilines and the corresponding disazo dyes prepared therefrom are shown below.

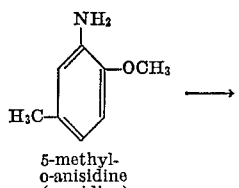

5-methyl-o-anisidine (cresidine)

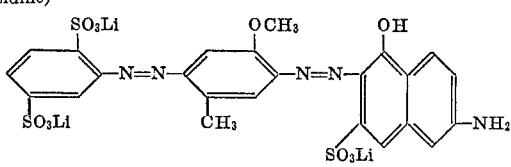

or

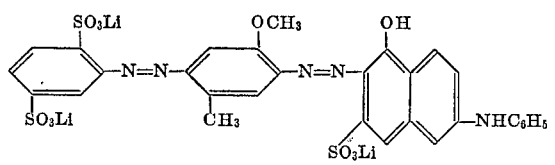

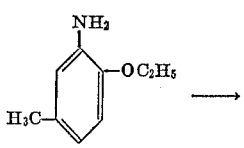

2-ethoxy-5-methyl aniline

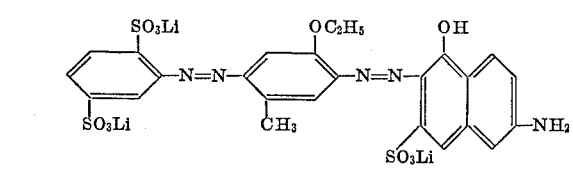

or

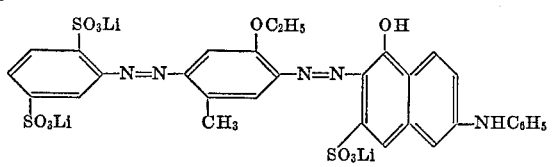

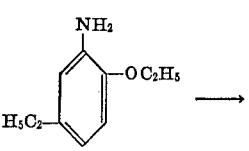

2-ethoxy 5-ethyl aniline

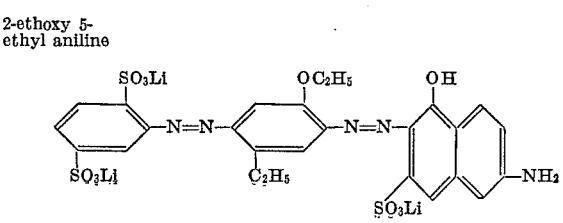

or

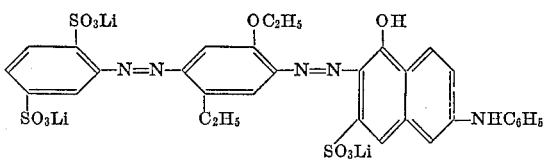

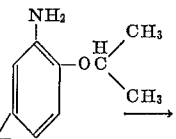

2-isopropoxy-5-methyl aniline

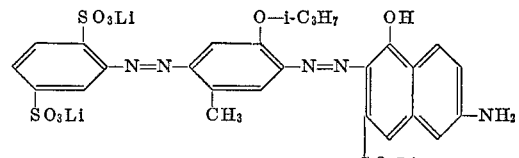

or

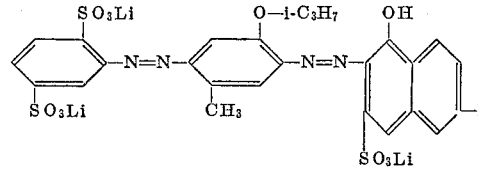

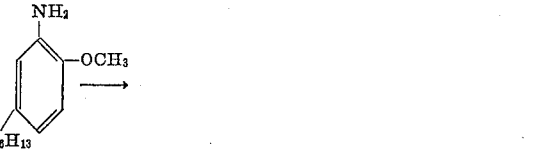

5-n-hexyl-o-anisidine

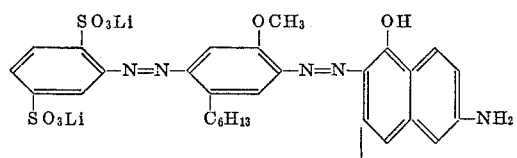

or

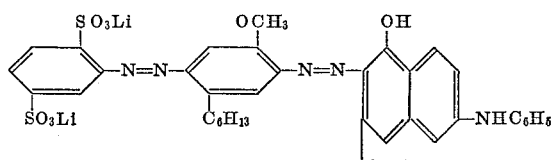

Mixtures of these and equivalent 2-alkoxy 5-alkylanilines can also be employed.

Preferably cresidine is employed in the manufacture of the present dyestuffs on account of its ready availability.

The preferred dye mixture of the invention is conveniently prepared by charging a mixture of I-acid and phenyl I-acid, or the lithium salts thereof, to the final coupling mixture of the dyestuff preparation. The two components may be charged in a molar ratio equal to that of the dyes which is desired in the product mixture. Charging I-acid and phenyl I-acid in a molar ratio of about 38:62 to about 42:58 provides a disazo dye mixture of especially attractive shade.

The disazo dyestuffs of the invention color paper, paper pulp and other cellulosic fibers in attractive bright violet shades which are exceedingly fast to light. The excellent water solubility of the present dyestuffs (about 15 weight percent or greater at ambient temperature) permits their use in concentrated aqueous dyebaths. Since these soluble dyes do not precipitate from the aqueous coupling solutions in which they are prepared, the latter dye solutions can be used directly in dyeing, thereby avoiding the costly isolation, purification and pulverization required in production of a solid dyestuff.

In the following examples, which illustrate the invention, parts, percentages and properties are by weight unless otherwise indicated and temperatures are in degrees centigrade.

EXAMPLE 1

At ambient temperature 161.4 parts moist 2-amino p-benzene disulfonic acid, containing 101.2 parts (0.4 mol) of the amino disulfonic acid, is agitated in 1000 parts of water, acidified with 100 parts by volume 20° Bé. aqueous hydrochloric acid and cooled to about 0°–5°. Over a period of about one hour, a solution of 28.4 parts (0.41 mol) sodium nitrite in 100 parts of water is charged dropwise to the cold agitated slurry. The diazotized mixture is agitated for about one hour and excess nitrous acid therein is destroyed by addition of sulfamic acid. Aqueous cresidine hydrochloride is prepared by acidifying an agitated mixture of 55 parts (0.4 mol) of cresidine and 600 parts water with 40 parts by volume 20° Bé. aqueous hydrochloric acid at 80–85° and cooling the resultant solution to ambient temperature. The aqueous amine salt solution is charged to the foregoing diazonium salt solution over a period of about an hour. After the coupling mass has been agitated for about 16 hours, 500 parts of lime-free sodium chloride is charged and resultant mixture is filtered to recover the precipitated monoazo coupling product. The filter cake is washed with a mixture of 40 parts by volume 20° Bé. aqueous hydrochloric acid and 400 parts water and dried under a current of air at ambient temperature. To an agitated slurry of 318 parts of monoazo coupling product in a solution of 27 parts lithium hydroxide monohydrate nd 200 parts water is charged 28 parts (0.41 mol) sodium nitrite. Over a period of about 2 hours this mass is charged dropwise to 100 parts by volume 20° Bé. aqueous hydrochloric acid which has been cooled to about 0–5°, the temperature of the mixture during addition being maintained below about 10°. The diazotized mass is agitated for about two hours and then charged over a period of about one hour to a mixture of 39.6 parts (0.166 mol) 6-amino-1-naphthol-3-sulfonic acid and 75.6 parts (0.24 mol) 6-anilino-1-naphthol-3-sulfonic acid, 40 parts lithium hydroxide and about 200 parts of water. After addition of 7 parts of lithium hydroxide monohydrate to raise the pH of the coupling mass to above about 9, the mixture is agitated for about 16 hours. The coupling mass is then filtered through a 200 mesh metal screen. There is thus obtained 1638 parts of aqueous solution containing about 15.03% of dissolved dye mixture of which about 41 mol percent is a dyestuff of the structural formula:

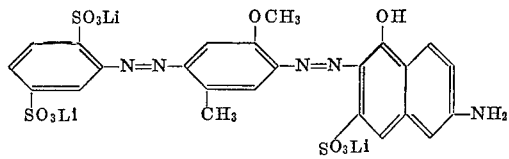

and about 59 mol percent is a dyestuff of the structural formula:

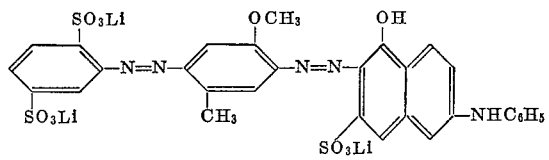

This liquid dyestuff mixture dyes paper in a bright bluish violet shade which is exceptionally fast to light.

EXAMPLE 2

The following comparative example illustrates the relatively poor water solubility of a dyestuff which differs from those of Example 1 in containing two sodium sulfonate substitutents instead of three lithium sulfonate substituents.

The procedure of Example 1 is repeated substantially as described except that 4-chlorometanilic acid and soda ash are employed in place of 2-amino p-benzene disulfonic and lithium hydroxide monohydrate respectively The dyestuff, a mixture of about 40 mol percent of dye having the structure

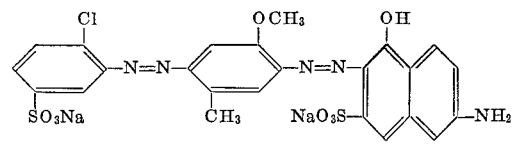

and about 60 mol percent of dye having the structure

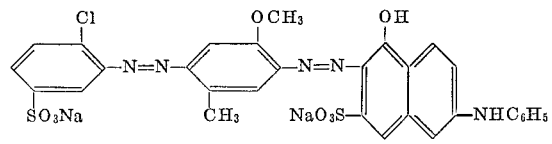

precipitates from the final coupling mixture indicating the relatively poor solubility of the product in water. The precipitated dyestuff is recovered by filtration of the coupling mixture and agitated in water (about 4880 parts per mol total naphthol sulfonic acid coupling components charged) for about 16 to 18 hours. After the resultant mixture has been heated to 75°, sodium chloride (about 292 parts per mol naphthol sulfonic acid coupling components charged) is added and the mixture is filtered to collect the dyestuff. After being dried at 75°, the dyestuff is ground with dextrin (about 1284 parts per mol naphthol sulfonic acid coupling components charged) and turkey red oil (about 8.1 parts per mol naphthol sulfonic acid coupling components charged). The resultant product containing 24.3% of the aforementioned dyestuff mixture has a water solubility of only 6.66% at ambient (25° C.) temperature (corresponding to a water solubility of only 1.62% for the dye mixture). In the following Example 3 this product is compared to the dye solution of Example 1 for dyeing paper.

EXAMPLE 3

To 250 parts by volume of an aqueous slurry containing 3 parts bleached sulfite paper pulp, is charged 7 parts by volume of a solution prepared by diluting 2 parts of the dye solution of Example 1 to 500 parts by volume with water. After the resultant aqueous mixture has been agitated for about 10 minutes, 3 parts by volume of a 3% aqueous slurry of a fortified rosin size and 4 parts by volume of a 10% aqueous solution of alum (aluminum sulfate octadecahydrate) are charged. After being agitated for an additional 20 minutes, the mixture is filtered through a metal screen. The recovered sheet of pulp is pressed between two layers of blotting paper to express any adherent dye liquor and dried at about 100°. In a comparative dyeing the foregoing procedure is repeated except that 10 parts by volume of a dye solution prepared by dissolving 1 part of the dye of Example 2 in 500 parts water is charged to the aqueous pulp slurry. The paper dyeing employing the dye of Example 1 is superior in brightness to the dyeing obtained with the dyestuff of Example 2. The dyed paper samples are exposed to light in a Fade-O-meter. The dyeing of the Example 1 dyestuff has a light fastness of about 5 hours (Standard Fade-O-meter hours) while that of the Example 2 color has a lightfastness of only about 2.5 hours (Standard Fade-O-meter hours).

TABLE

| Example No. | Amino naphthol sulfonic acid coupling component | Disazo dyestuffs | Brightness of paper dyeing [1] |
|---|---|---|---|
| 4 | 6-amino-1-naphthol-3-sulfonic acid | (structure shown) | Superior. |
| 5 | 6-anilino-1-naphthol-3-sulfonic acid | (structure shown) | Do. |
| 6 | Mixture of 6-amino-1-naphthol-3-sulfonic acid and 6-anilino-1-naphthol-3-sulfonic acid (Example 1). | Mixture comprising 41 mole percent dyestuff of Example 4; 59 mole percent dyestuff of Example 5. | Superior.[2] |
| 7 | 6-(p-sulfoanilino)-1-naphthol-3-sulfonic acid. | (structure shown) | Poor.[3] |

[1] Compared to dyeing of the Example 2 dye.
[2] The tinctorial strength of the Example 6 dye mixture is about 10% greater than that of the Example 4 dye and about 2.3% greater than that of the Example 5 dye.
[3] The tinctorial strength of the Example 7 dye is about 17.5–25% less than that of the dyes of Examples 4 to 6.

EXAMPLES 4–7

In Examples 4–7, summarized in the table above, the procedure of Example 1 is repeated substantially as described employing amino naphthol sulfonic acid coupling components other than the mixture of 6-amino- and 6-anilino-1-naphthol-3-sulfonic acids charged in Example 1 and lithium carbonate in place of lithium hydroxide monohydrate. Paper dyeings of these dye solutions obtained by a procedure substantially similar to that of Example 3 are compared with paper dyed with the dyestuff of Example 2. Example 7 is a comparative example illustrating the relatively poor dyeing on paper of a dyestuff which, although similar to the dyestuffs of my invention, contains an excessive number (four) of lithium sulfonate substituents.

I claim:

1. A dyestuff mixture comprising approximately 40% of a dyestuff of the formula

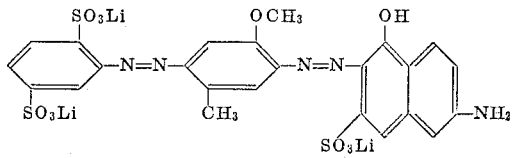

and approximately 60% of a dyestuff of the formula

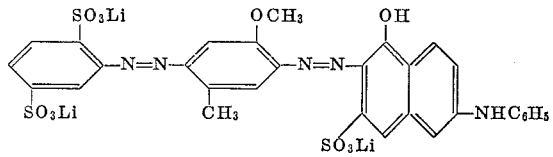

References Cited

UNITED STATES PATENTS 1,650,090    11/1927    Neelmeier et al. _____ 260—191

OTHER REFERENCES

Color Index, vol. 3, 2 Ed., 1956, p. 3232.

GEORGE F. LESMES, Primary Examiner

P. C. IVES, Assistant Examiner

U.S. Cl. X.R.

8—7